June 20, 1933.  E. J. VON PEIN ET AL  1,914,388
WEIGHT RECORDER
Filed March 30, 1931    9 Sheets-Sheet 1
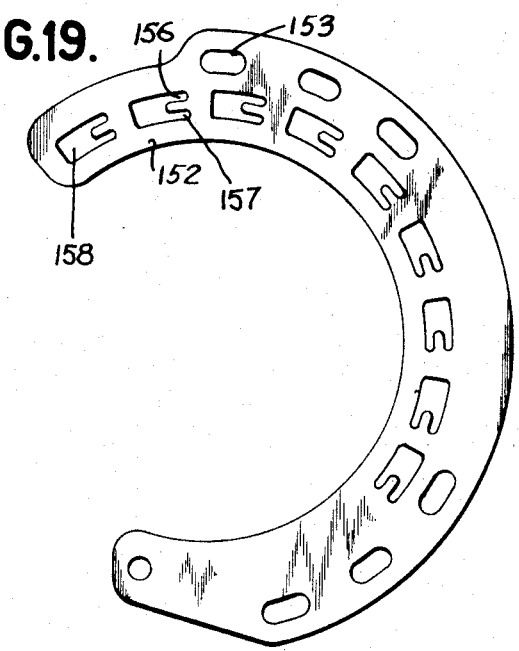
FIG.19.
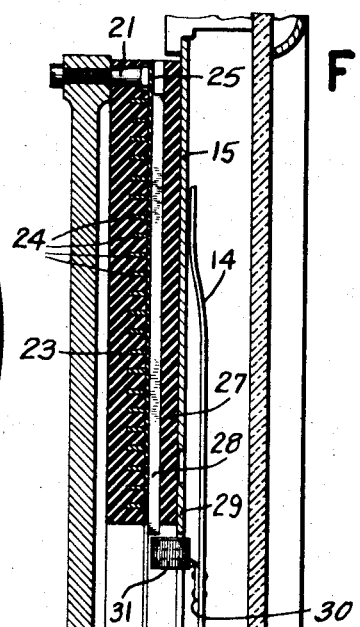
FIG.1.
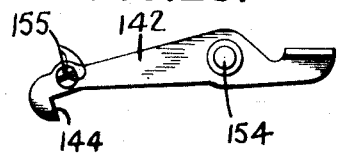
FIG.20.
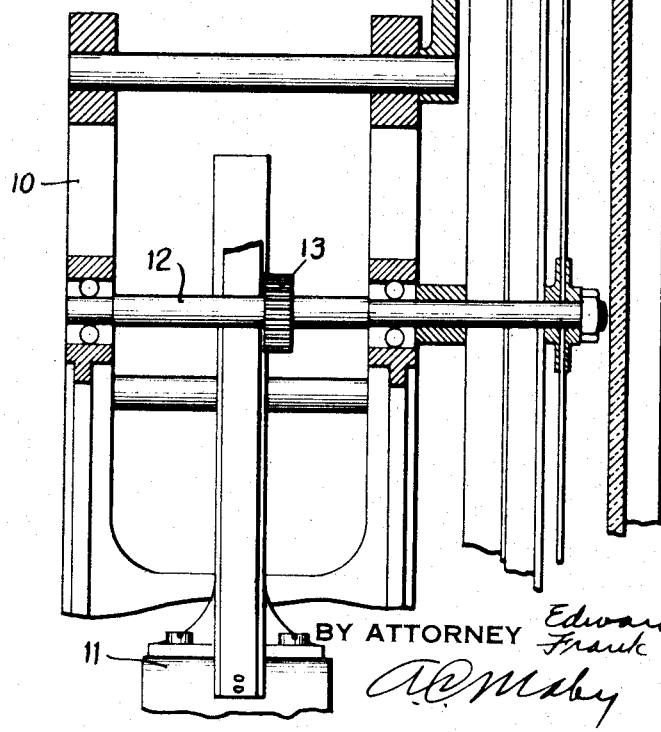
INVENTORS
Edward J. Von Pein &
Frank Showalter
BY ATTORNEY

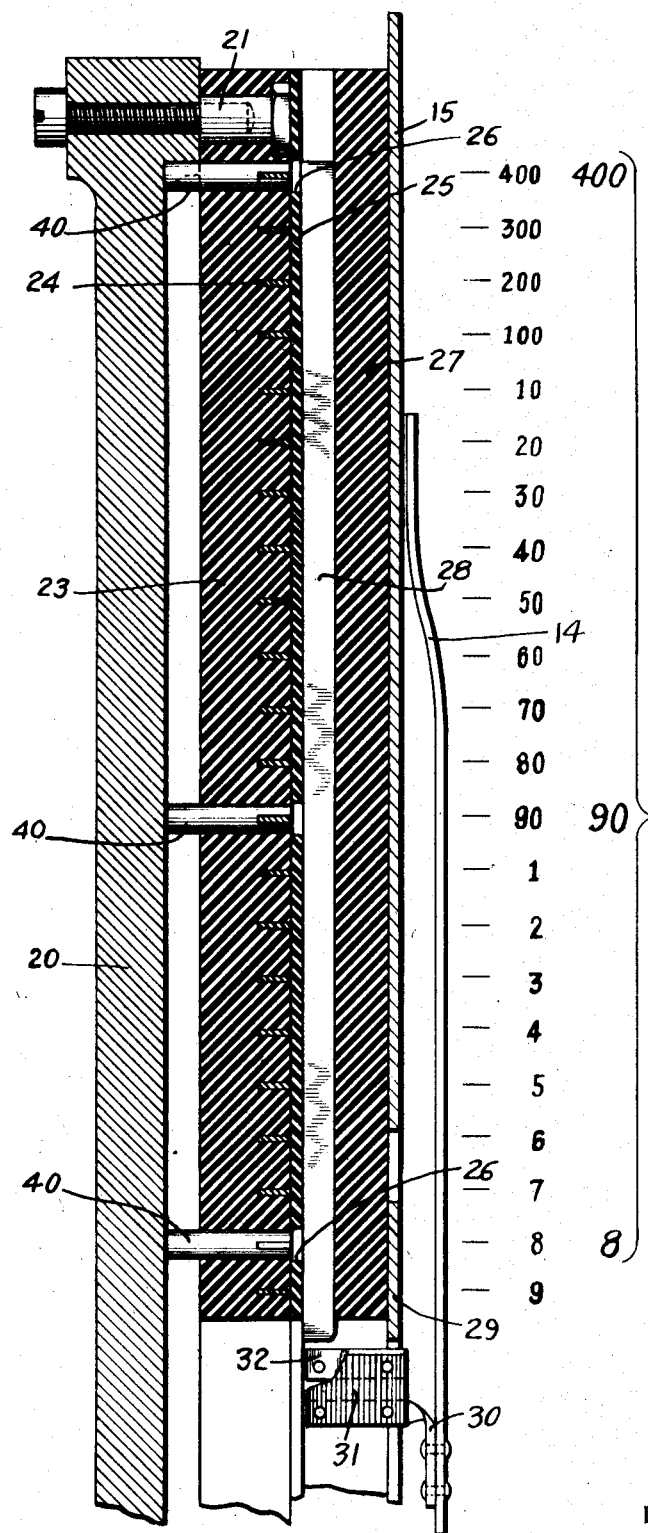

June 20, 1933.  E. J. VON PEIN ET AL  1,914,388
WEIGHT RECORDER
Filed March 30, 1931   9 Sheets-Sheet 3

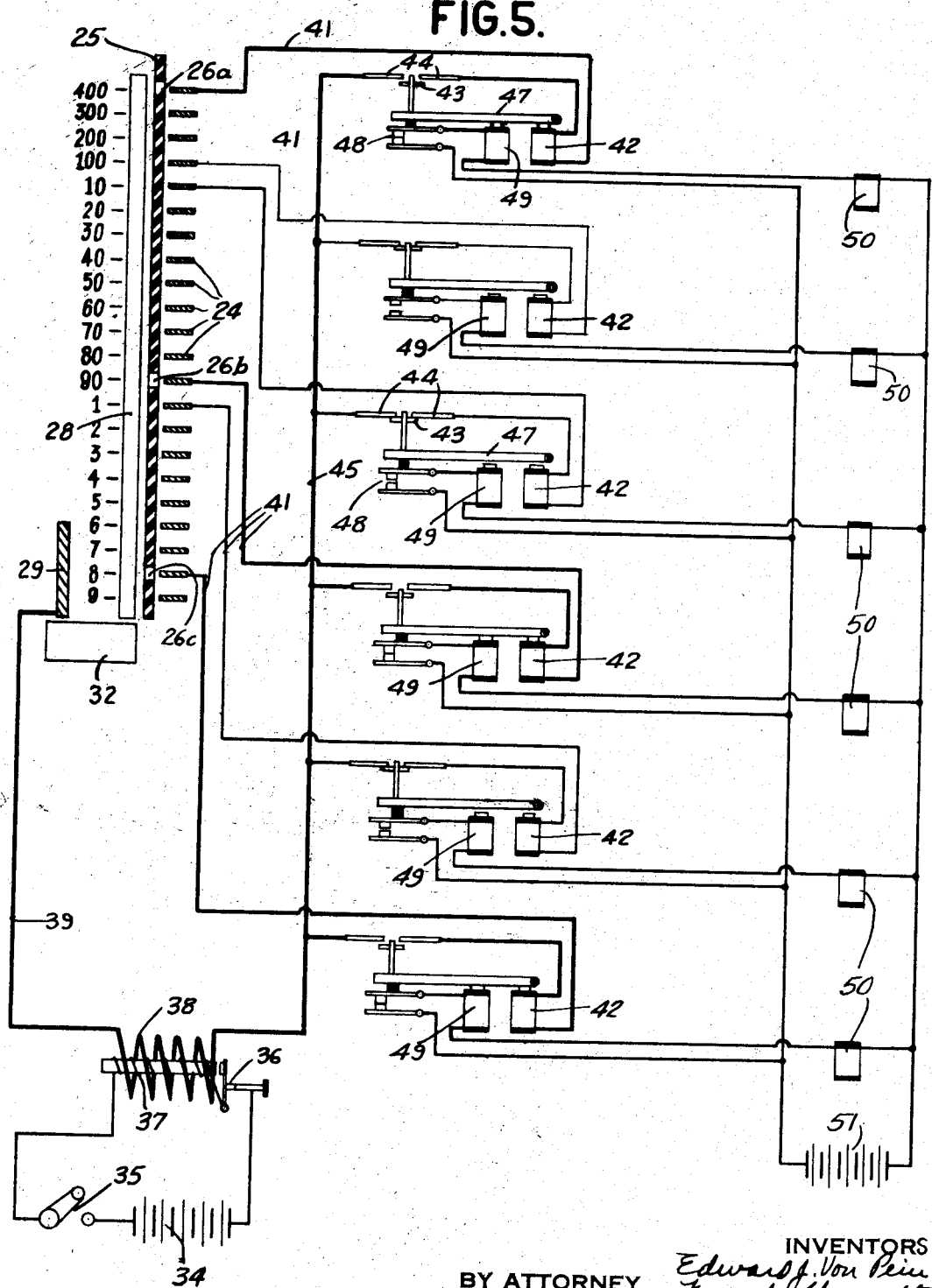

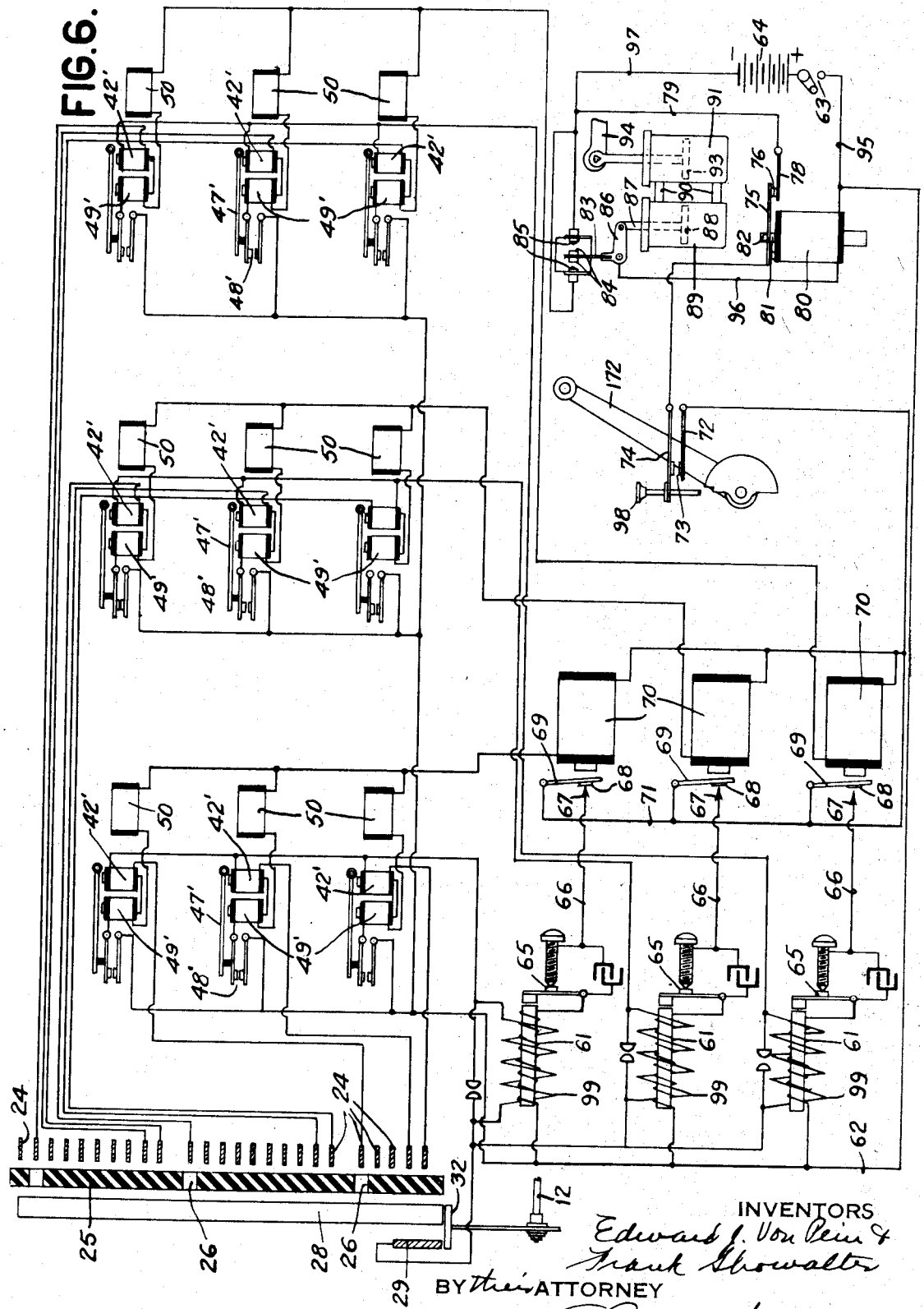

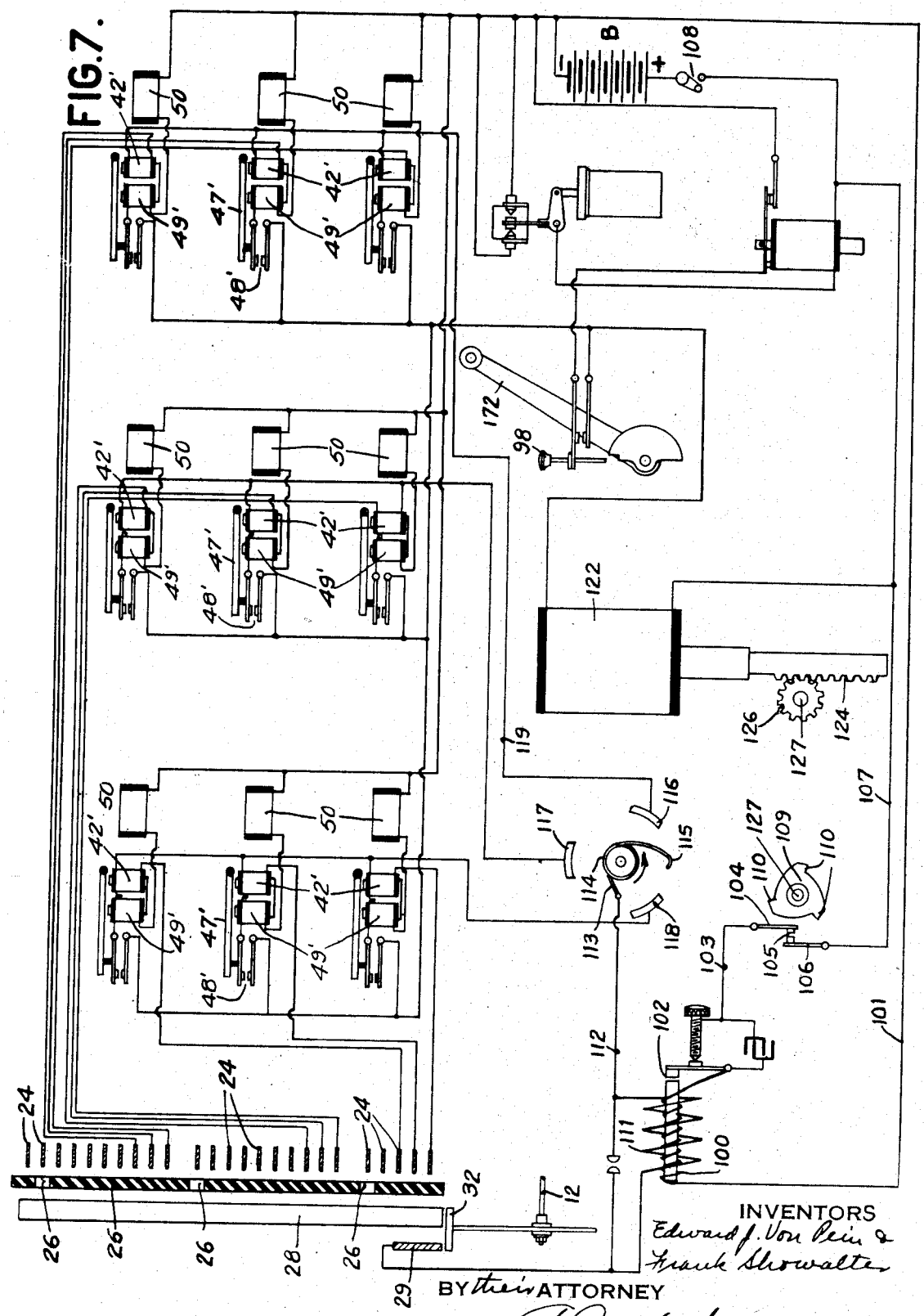

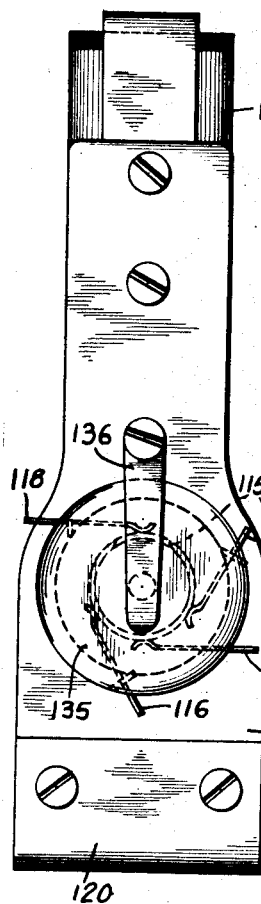
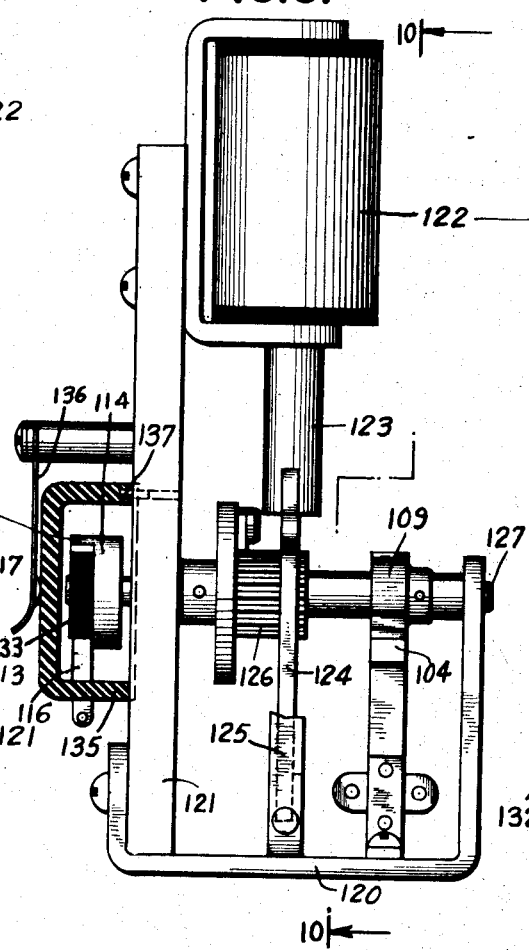
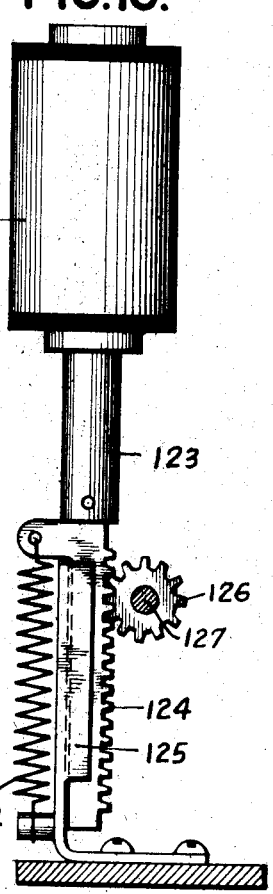
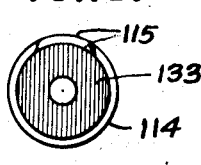
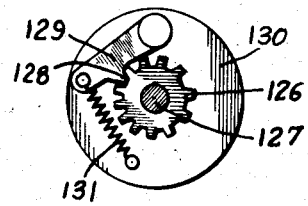
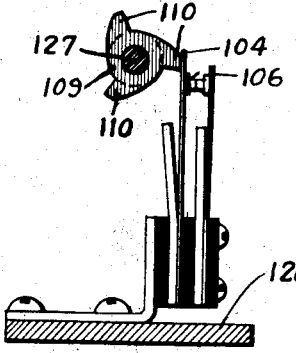
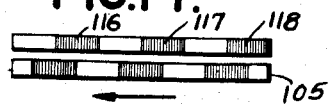

June 20, 1933.  E. J. VON PEIN ET AL  1,914,388
WEIGHT RECORDER
Filed March 30, 1931   9 Sheets-Sheet 8

INVENTORS
Edward J. Von Pein
Frank Showalter
BY their ATTORNEY

June 20, 1933.  E. J. VON PEIN ET AL  1,914,388
WEIGHT RECORDER
Filed March 30, 1931   9 Sheets-Sheet 9

INVENTORS
Edward J. Von Pein &
Frank Chowalter
ATTORNEY

Patented June 20, 1933

1,914,388

UNITED STATES PATENT OFFICE

EDWARD J. VON PEIN AND FRANK SHOWALTER, OF DAYTON, OHIO, ASSIGNORS TO DAYTON SCALE COMPANY, OF DAYTON, OHIO, A CORPORATION OF NEW JERSEY

WEIGHT RECORDER

Application filed March 30, 1931. Serial No. 526,296.

This case relates to weighing scales and auxiliary devices controlled thereby.

Generally, the object of the invention is to provide novel means for controlling auxiliary devices from a scale.

Further, the object is to control auxiliary devices from a scale without interfering with the freedom of movement of any part of the scale.

Further still, the object is to sense or analyze the position of the scale under a load by means which do not contact with the scale at any time and to control by the sensing or analyzing means an indicating or registering or recording means.

Another object is to differentially control a counter or recorder by a jump spark analyzer.

Still another object is to analyze multidenomination loads on a scale with a minimum of error by confining each selection by the analyzer to a definite load.

Another object is to successively analyze different denominations of a load on a scale.

Various other objects and advantages of our invention will be obvious from the following particular description of one form of mechanism embodying the invention or from an inspection of the accompanying drawings; and the invention also constitutes certain new and novel features of the construction and combination of parts hereinafter set forth and claimed.

In the drawings:

Fig. 1 is a section through the upper portion of the scale including the analyzing means.

Fig. 2 is an enlarged section through the analyzer.

Fig. 5 is a circuit diagram of one form of the invention.

Fig. 6 is a circuit diagram of another form of the invention.

Fig. 7 is a circuit diagram of still another form of the invention.

Fig. 8 is an end view of the motor device for cyclically controlling the establishment of the various circuits of the analyzer.

Fig. 9 is a front view of the motor device.

Fig. 10 is a section on line 10—10 of Fig. 9.

Figs. 11 to 13 are details of the motor device.

Fig. 14 is a diagram showing relative timing of high and low tension circuits during an analyzing cycle.

Figure 15:
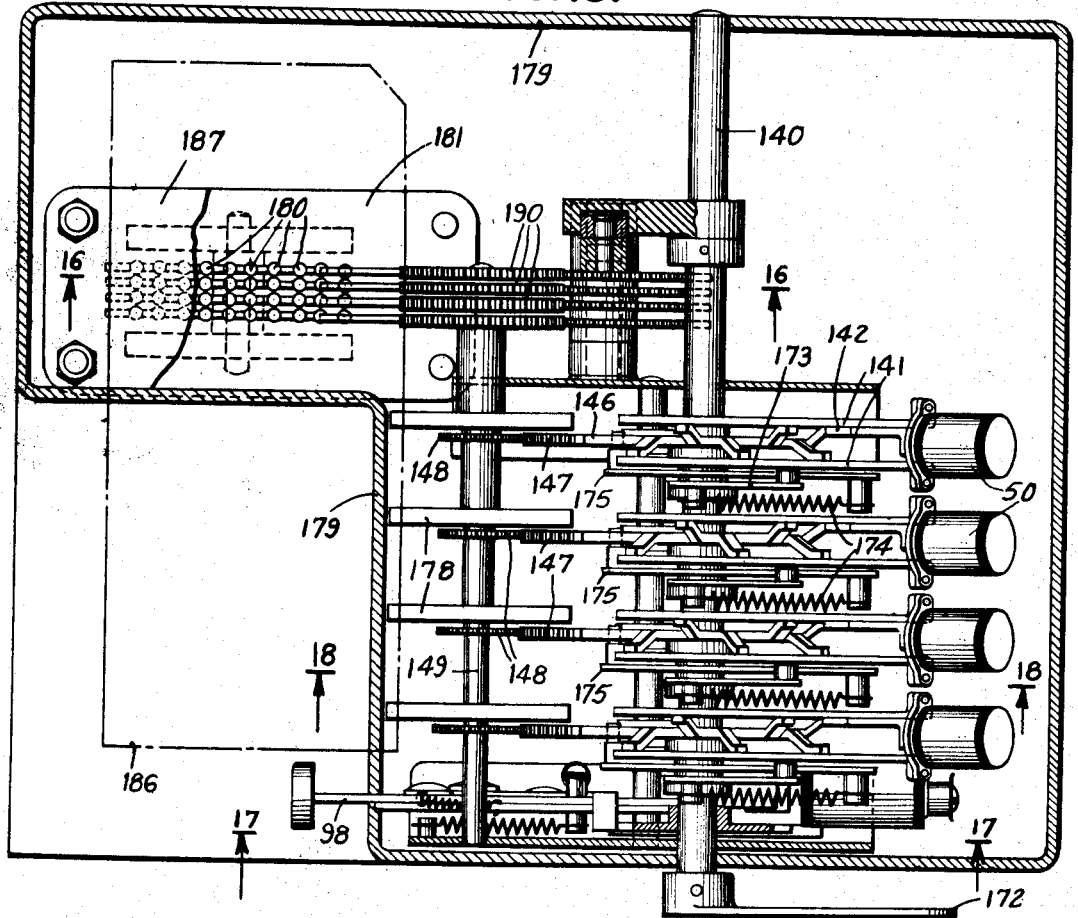
Fig. 15 is a plan view of the recorder and indicator controlled by the analyzer.
Figure 16:
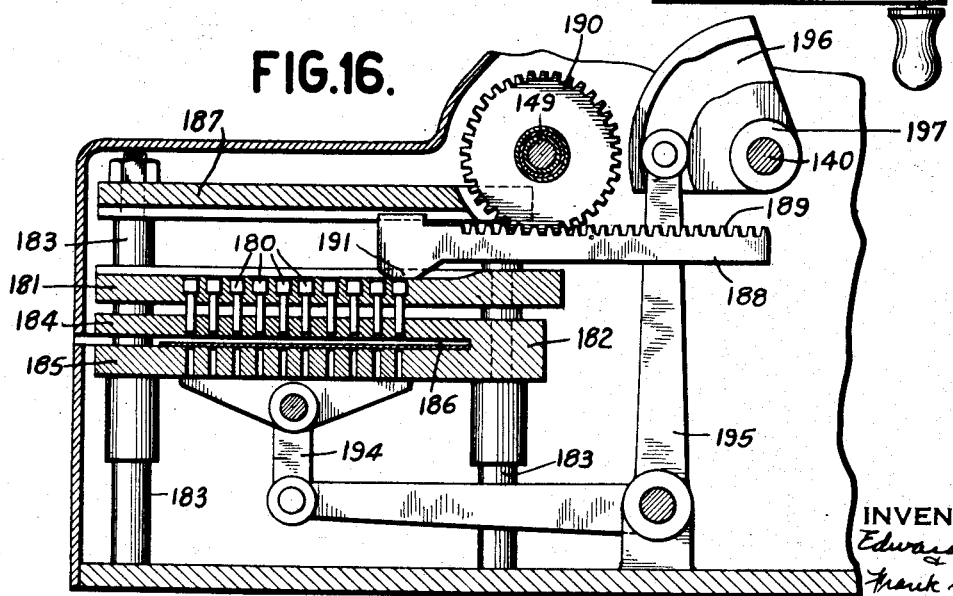
Figure 17:
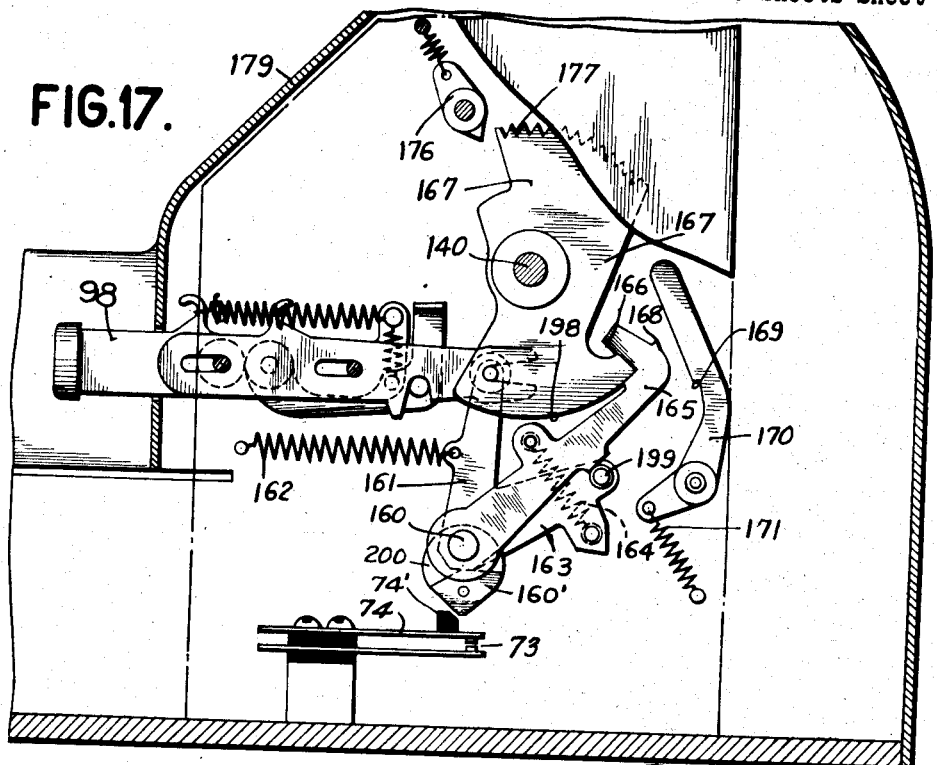
Figure 18:
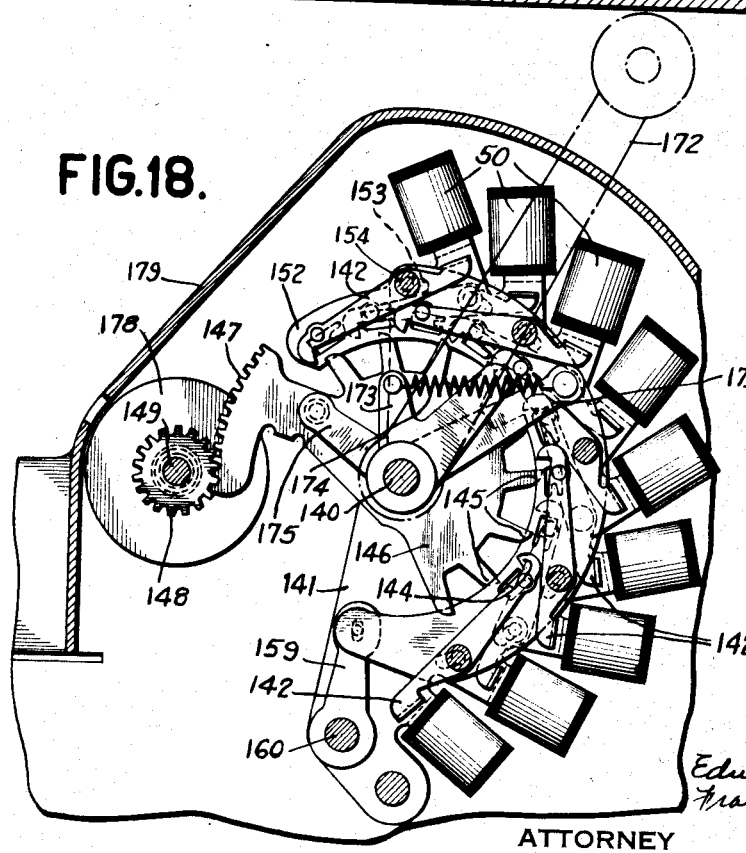

Figs. 16, 17, and 18 are sections on lines 16—16, 17—17, and 18—18 respectively of Fig. 15.

Fig. 19 is detail of a detent plate for control pawls of one bank of the recorder.

Fig. 20 is a detail of a control pawl of the recorder.

Figure 21:
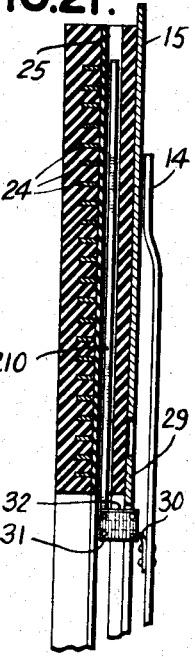

Fig. 21 is a section similar to Fig. 1 of a modified analyzer.

The invention is herein illustrated and described in connection with a five hundred pound scale of the pendulum dial type shown in Patent 1,777,873. It will be obvious that the principles of the invention are applicable equally well to many other types of scales.

Figure 3:
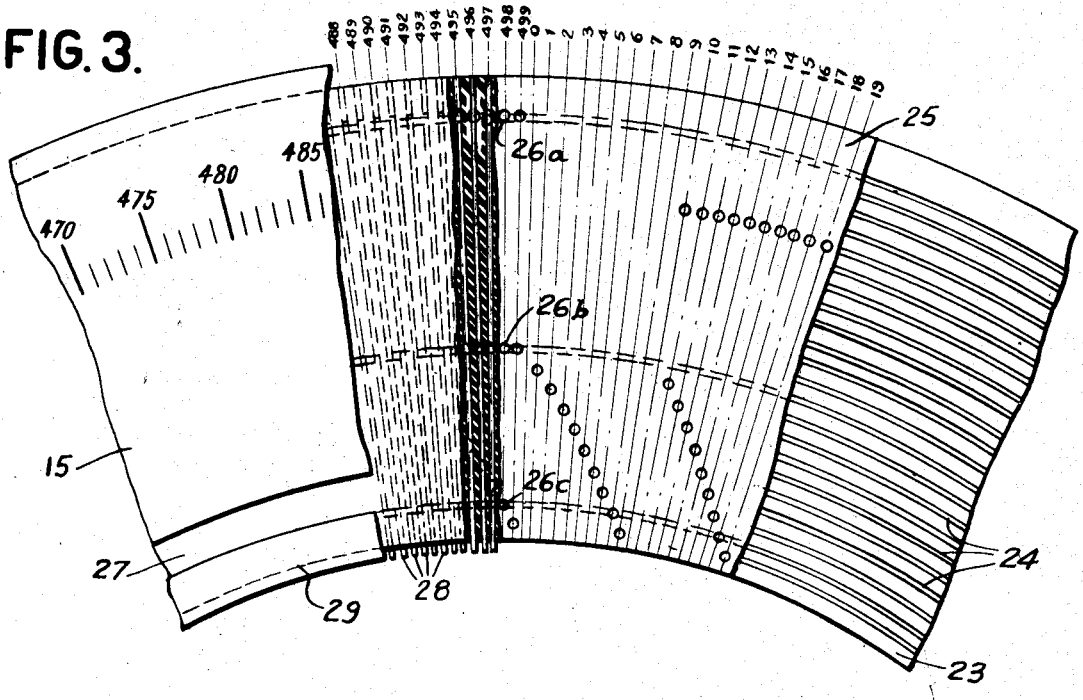
Fig. 3 is a front view of the load sensing mechanism with successive layers removed to show the parts more clearly.
Figure 4:
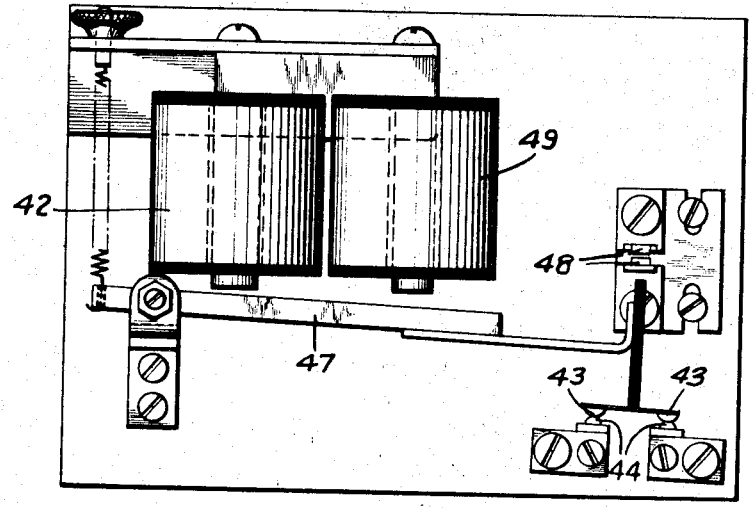
Fig. 4 is a detail of high and low tension magnets in the analyzer means.

In detail, referring to Figs. 1 to 3 which show the structure of the scale and selector parts, 10 is the supporting frame for pendulums 11 and indicator shaft 12 which carries a pinion 13 driven from the pendulum system as more fully shown in above mentioned Patent 1,777,873.

At its right end, as viewed in Fig. 1, the indicator shaft carries a pointer 14 movable over the face of an indicating scale dial 15 in the form of a ring graduated in pounds from 0 to 500. In back of the scale dial, frame 10 supports a circular bracket 20 to which is attached by bolts 21 a selector or load analyzer assembly. The latter includes an insulator disk or ring 23 in which are set twenty-four concentric conductive bands 24, which terminate flush with the front face of the ring. The four outermost bands respectively represent in descending radial order 400, 300, 200, and 100 pound readings. The next nine bands respectively represent in descending radial order, 10, 20, 30, 40, 50, 60 . . 90 pound readings, while the innermost bands represent in descending radial order 1, 2, 3 . . . . . 9.

Secured to the face of the disk 23 and covering the bands 24 is an insulator plate 25 of mica or the like perforated in accordance with the dial indications. The perforations 26 in combination with bands 24 translate the dial indications.

Thus, as shown in Figs. 2 and 3, the indication 498 on the dial 15 is translated by a perforation 26a in mica plate 25 in front of the 400 pound band 24, a perforation 26b in front of the 90 pound band 24, and a perforation 26c in front of the 8 pound band 24.

Secured to the assembly in front of and substantially in contact with mica plate 25 is an insulator disk or ring 27 in which are set five hundred radial conductive bars 28. The latter are circumferentially spaced apart and one bar is provided for each pound position on the scale dial 15.

The scale dial 15 is secured to the front face of insulator disk 27. Also secured to the front face of the disk 27 is a conductive ring 29 located inside the dial ring. The inner circumferential edge of ring 29 terminates substanially at the same radial distance from the axis of rotation of pointer 15 as the inner edges of radial bars 28. The pointer 14 carries a small light bracket 30 to which is fastened an insulator block 31 carrying an axially extending conductive strip 32. The strip 32 extends across the inner edges of radial bars 28 and conductive ring 29 and is the same radial distance from both. After the radial bars and the conductive ring 29, have been fixed in the assembly, their inner edges may be accurately finished to form true circles concentric with the path of the strip 32.

There is a gap between the strip 32 and the adjacent radial bar 28 and a similar gap between the strip 32 and the inner edge of ring 29. By disposing strip 32 parallel to shaft 12 of the indicator, endwise movement of the latter does not vary the length of the gaps. When the pointer comes to rest under a load, the strip 32 thereon is adjacent a radial bar 28 corresponding to the load.

According to this invention, a circuit is formed between ring 29, strip 32, and the adjacent bar 28 in which the gap between the strip and bar 28 and that between the strip and ring 29 are bridged by sparks.

One method of forming this circuit is shown in Fig. 5. Referring to this figure, the current flows from one side of a battery 34 through a hand switch 35, the primary winding 37 of an induction coil, and through an interrupter 36 to the other side of the battery. Interrupter 36 functions to intermittently interrupt energization of winding 37, thereby inducing a high tension charge in the secondary winding 38. From one side of the secondary the charge is led through a line 39 to the conductive ring 29 from which a spark discharges to strip 32 from which in turn a spark jumps to that radial bar 28 closest to the strip. From the bar 28, sparks are discharged through the perforations 26 covered by this bar to the bands or hoops 24 behind these perforations. The maximum reading in the instant case is a three denomination number. Assume for example that the load is 498 pounds. Referring to Fig. 3, the radial bar corresponding to this load covers a perforation 26a in front of the outermost or 400 lb. hoop 24, a perforation 26b in front of the 90 lb., hoop 24, and a perforation 26c in front of the 8 lb. unit, hoop 24. Sparks may jump successively in any order or simultaneously as the case may be from the radial bar through perforations 26a, b, and c and to the 400 lb., 90 lb., and 8 lb. hoops 24. To each hoop is connected a terminal plug 40 from which a line 41 goes to one side of a high tension magnet 42.

The other side of the magnet is in series with normally closed contacts 43 and 44. From a contact 44, a lead 45 returns to the secondary 38 of the induction coil, in the above manner, circuits are formed through high tension magnets 42 corresponding to the load on the scale. Upon energization of a magnet 42, its armature 47 is attracted releasing contact 43 carried thereby from divided contacts 44 and opening the circuit through magnet 42. While releasing contact 43 from contacts 44, the armature closes contacts 48. This energizes a low tension magnet 49 in series with a recorder control magnet 50 and a battery 51. Magnet 49 holds armature 47 attracted to prevent contacts 43 and 44 again closing. Magnet 50 sets means for controlling the recorder device which will be further explained hereinafter.

Fig. 6 is a circuit diagram of a different arrangement for forming the high tension circuits. In this arrangement, three induction coils are used, primaries 61 being connected at one side to a common line 62 leading to hand switch 63 and the plus side of a battery 64. The other sides of the primaries are connected through their interrupters 65 to separate lines 66 which lead to contacts 67 engageable with contacts 68 on pivoted armature blades 69 of relay coils 70. There is one coil 70 in series in the same circuit with one of the recorder magnets 50 and connected low tension magnet 49′. The armatures are connected through a common line 71 to a contact blade 72 having a contact stud 73 engageable with a contact stud 73 on a cooperating contact blade 74. This blade 74 is conductively connected to a spring contact blade 75 which has a contact 76 cooperable with a similar contact 76 on a blade 78. The latter through lead 79 is connected to the minus side of the battery 64.

The contacts 76 are controlled by a solenoid 80, the core 81 of which has at its upper end a pin 82 for engaging the upper contact blade 75. The circuit through solenoid 80 is adapted to be completed through the contact strip 83 having opposite contact lugs 84 centrally disposed between contact lugs 85. The strip 83 is carried by a bell lever 86 pivoted to the plunger rod 87 of a plunger 88 movable in an auxiliary dash pot 89. The latter through pipes 90 is connected to the main dash pot 91, the piston 93 of which is connected to a movable element 94 of the weighing scale. When a load is placed on the scale, the liquid in the dash pots 91 and 89 is caused to surge. This surge continues at a decelerating rate until element 94 comes to rest. At this time, the scale is in equilibrium under the applied load. While the liquid in the dash pot is surging, the bell lever 86, oscillates correspondingly oscillating spring strip 83 and causing rapid making and breaking of contacts 84 and 85. The contacts are made rapidly enough to cause a circuit to be formed through solenoid 80 from the plus side of the battery 64 through switch 63, line 95, the solenoid 80, line 96, strip 83, contacts 84, 85 and line 97 to the minus side of the power source. The solenoid being energized moves the core 81 upwardly releasing contact blade 75 and causing contacts 76 to break. While contacts 76 are open, the circuit through the primaries cannot be completed. When the scale is in equilibrium, contacts 84 and 85 are open, solenoid 80 is deenergized and core 81 descends engaging contact blade 75 to close contacts 76. Now if control button 98 is depressed, it will move contact blade 74 towards contact blade 72 closing contacts 73 and completing the circuits through the primaries of the induction coils.

The intermittent interruption of the circuits through the primary by interrupters 65 will cause surges of high voltage current through the secondaries 99 of the induction coils. All three secondaries 99 are connected to the common conductive ring 29. From this ring, a spark will jump to strip 32 and from the latter a spark will jump to the radial bar 28 closest to the strip. Assume that the charge on the bar 28 discharges simultaneously through a maximum of three perforations, one in each denomination of a three denominational order load to the hoops 24 behind the perforations. The hoops 24 are connected to high tension magnets 42' which when energized operate pivoted armatures 47' to close contacts 48'. These contacts close a circuit from plus side of battery 64, through hand switch 63, lines 95 and 62, contacts 48', low tension magnets 49', recorder magnets 50, primary control magnets 70, blade 72, contacts 73 (now closed by key 98), blades 74 and 75, contacts 76, blade 78 and lines 79 and 97 to the minus side of the battery.

Assume that instead of sparks jumping simultaneously from the radial bar 28 through the three perforations, a spark first discharges from the radial bar 28 through a perforation opposite a band 24 in the hundreds bank. This will cause energization of a high tension magnet 42' directly connected to said band 24 without intervention of contacts such as 43 and 44 of the first form shown in Fig. 5. The magnet 42' being energized attracts its armature 47' which effects closure of contacts 48'. This completes a circuit through the magnet 49', the associated recorder magnet 50 of the hundreds bank, and the relay 70 associated with the hundreds bank.

Energization of this relay 70 attracts its armature 69 breaking contacts 67 and 68. The circuit through the primary of the connected induction coil is thus broken, breaking the circuit through the secondary thereof and thus deenergizing the magnet 42' controlled thereby. Energization of serially connected magnets 49', 50, and 70 is maintained, however, until contacts 73 are opened as will be hereinafter explained. The hundreds induction coil is now inoperative and either the tens or units induction coil is next operative to energize the associated magnets 42', 49', 50, and 70 of a recorder bank.

In this manner, the recorder magnets 50 may be successively energized without employing a high tension spark gap such as between contacts 44 of the first form (Fig. 5) to interrupt the circuit through the high tension magnets.

Fig. 7 is a circuit diagram of still another form of the invention. In this form, the order in which the spark gaps of the hundreds, tens, and units bank are bridged is predetermined. Here again as in the first form, a single induction coil is used. The primary 100 of the induction coil is connected by line 101 to the minus side of the storage battery B. The other side of the primary is connected through interrupter 102 and line 103 to a contact blade 104 having a contact 105 engageable with contact 105 on a blade 106. The latter through line 107 and main switch 108 is connected to the plus side of the battery. Contacts 105 make under control of a rotary ratchet cam 109 having three similar spiral teeth 110. As the cam 109 makes one revolution, the teeth 110 will cause the contacts 105 to make three times. Each tooth is shaped to hold the contacts closed an appreciable time.

Between successive teeth 110, there is an abrupt drop so that the contacts 105 will be rapidly broken when the blade 104 drops off the high point of a tooth. While the contacts 105 are closed by a tooth 110, interrupter 102 causes surges in the E. M. F. of the primary coil which induces a high E. M. F. in the secondary coil 111. As in the previous forms, one side of the secondary is connected to the common conductive ring 29. In the present form, the other side of the secondary is connected by lead 112 to a brush 113 engaging contact ring 114 of a distributor. The contact ring has a laterally extending contact segment 115 which as it rotates in the direction of the arrow successively engages a units brush 116, a tens brush 117, and a hundreds brush 118. The units brush 116 is connected by lead 119 to one side of each high tension magnet 42' of the units bank. These magnets are similar to the magnets 42' of the second form of the invention. The other sides of unit magnets 42' are connected to their respective unit bands 24. While the contact segment 115 is engaged by units brush 116, the tendency for the charge on the radial bar 28 corresponding to the applied load is to discharge through the unit perforation 26 covered thereby. The high tension circuits through the tens and hundreds bank being open in the distributor, they will not tend to be completed by sparks jumping from the radial bar 28 through tens and hundreds perforations 26.

After the segment 115 of the distributor rides off the units brush it moves across a gap to the tens segment 117. During its movement across the gap, the contacts 105 are again closed by the cams 110 to build up the potential in the induction coil. At this time, there will be no tendency for a spark to jump through any of the perforations because of the gap in the distributor contacts. When the arm 115 engages the tens segment 117, the spark will jump from radial bar 28 through the perforation 26 in front of the tens band 24, thus causing energization of the connected tens magnet 42'.

Similarly, when the arm 115 engages the hundreds segment 118, a spark will be sent through the perforation 26 in front of the hundreds band 24 and a magnet 42' connected to this band will be energized.

The engagement of the distributor brushes 116, 117 and 118 with the contact segment 115 is timed with the control of contacts 105 by teeth 110 of ratchet cam 109 in accordance with the scheme of Fig. 14 wherein the shaded sections of the figure indicate periods of closed contacts. This figure shows that contacts 105 are closed before engagement of a units, tens or hundreds brush with contact segment 115.

The circuit through the primary being thus closed, interrupter 102 functions to charge the secondary 111. While contacts 105 are still closed, brush 116, 117, or 118 engages the contact segment 115 of the distributor to close a high tension circuit. The charge in secondary 111 now tends to discharge as above described. When brush 116, 117, or 118 and contact segment 115 are about midway of their relative travel, cam 105 releases blade 104 and contacts 105 open thereby breaking the primary circuit.

The break is abrupt and causes a rapid change in flux lines of the primary, thereby inducing a peak charge on the secondary. A maximum voltage in the high tension circuit is thus generated when the brush 116, 117, or 118 is about midway of the contact segment 115. In this manner, it is assured that enough energy will be furnished when needed for closing the gaps in the high tension circuits. It is also evident from Fig. 14 that by the time brush 116, 117, or 118 disengages segment 115, the primary circuit has been broken long enough for the induced E. M. F. in the secondary to reach a minimum, so that there will be no tendency for sparking to occur upon separation of a brush 116, 117, or 118 from segment 115.

Figs. 7 to 14 illustrate the means for operating contact disk 109 and distributor 114.

Mounted on a base 120 is an upright 121 of insulating material which supports a solenoid 122. The latter when energized attracts its plunger 123 which at its lower end supports a rack 124 sliding in a guide 125. Rack 124 meshes with pinion 126 which is free to turn on shaft 127. The upward movement of plunger 123 turns pinion 126 clockwise, as viewed in Fig. 11, for a single revolution. The pinion 126 is engaged with a projection 128 on a dog 129 pivoted to a disk 130 fast to shaft 127. The dog 129 is normally urged by spring 131 towards the pinion 126. When the latter rotates clockwise, it carries dog 129 along with it, thus rotating shaft 127 for one revolution. When spring 132 returns plunger 123 to its lower position, pinion 126 is rotated counterclockwise.

During this movement, the teeth of the pinion merely engage the right side of projection 128 of dog 129 to cam the dog outwardly against resistance of spring 131 without imparting rotation to the dog or its carrying disk 130. Thus shaft 127 does not rotate when the plunger returns to initial lower position.

This distributor is mounted on the left hand end of shaft 127 as viewed in Fig. 9. The distributor comprises an insulator hub 133 (see Fig. 13) fast to the shaft. Encircling the hub 133 at the right is the contact ring 114 constantly engaged by brush 113. Extending axially from the ring 114 is the contact segment 115 successively engaging unit brush 116, tens brush 117, and hundreds brush 118. All the brushes are secured to an insulator cup 135 held within a circular groove in upright 121 by means of a leaf spring 136. A pin 137 between cup 135 and upright 121 is provided to hold the cup against rotation in the locating groove of the upright.

Ratchet cam disk 109 is of insulating material and is pinned to shaft 127 adjacent the right hand end of the latter as viewed in Fig. 9. Contact blades 104 and 106 are secured to the base 120 in cooperative relation to the cam disk 109 as shown in Fig. 12.

As in the second modification, energization of magnets 42' causes magnets 49' and 50 to be energized to set the recording devices. The making of any of the circuits is initiated by operation of control button 98 when the scale comes to equilibrium under an applied load as explained with respect to the second modification.

The recording mechanism to be described below and shown in Figs. 15 to 20 is adapted to be controlled by any of the three forms of scale sensing devices shown in Figs. 1 to 14.

The recorder includes three banks of elements, one bank for each denomination of a three denominational order number. The "hundreds" bank has only four magnets 50, each associated with one of the hundreds bands 24, while the tens and units bank have each nine magnets 50, each associated with a corresponding tens or units band 24. A fourth recorder bank is shown in Fig. 15 which is adapted to be controlled by a fractional pound sensing device fully described in a copending application, Serial No. 506,650 and which is not concerned with the present invention.

The magnets 50 of each bank are arranged arcuately about the main operating shaft 140. Each bank of magnets is carried between two side plates 141 (Figs. 15 and 18). To these plates are pivoted the armature pawls 142 coacting with the magnets. Suitable springs (not shown) normally hold the associated pawls 142 retracted relative to the magnets. The noses 144 of the pawls are disposed opposite associated lugs 145 integral with and arcuately disposed on a member 146 of the bank.

The member 146 has at one side a rack portion 147 meshed with a pinion 148 on a shaft 149. The shafts 149 operated by the members 146 of each recorder bank are in nested formation as shown in Figs. 15, 16, and 18. The pawl noses of a bank are differentially spaced from their associated lugs 145 in a manner to stop the member 146 after it has moved one to nine definite steps. Thus the first uppermost pawl is adapted to stop the member 146 after the latter has moved one step, the next pawl is adapted to stop the member after it has moved two steps, and so on. When one of the magnets 50 of a bank is selected for energization by the operation of the load analyzing or sensing means, above described, it attracts the associated pawl 142 moving the nose 144 thereof into the path of a lug 145. Thus if the magnet 50 connected to the units band 24 for reading "8" on the scale is energized, it attracts its pawl 142 to position it for stopping member 146 after it has moved eight steps.

The pawls after actuation are locked by detent plates 152 (Figs. 18 and 19) there being one to each bank. Each plate has several elongated slots 153 riding on pivot pins 154 (Figs. 18 and 20) of the pawls of a bank. Adjacent the nose end, a pawl has a thin flat tongue 155 adapted to seat in either of the notches 156 or 157 of slots 158 of the detent plate. When a pawl is in retracted position, its tongue will be alined with notch 156 and when in actuated position, its tongue will be alined with notch 157. Prior to actuation of the detent plate, the tongues lie in the upper and wide part of slot 158.

When the detent plate is actuated upwardly one of the notches 156 or 157 engages the pawl tongue 155 to hold the pawl against movement. The detent plates are operated by arms 159 pinned to their lower ends, these arms being fast to a shaft 160 (Figs. 17 and 18) operated from the control button 98.

When the control button 98 is depressed, it rocks a bell lever 161 loose on shaft 160 clockwise against resistance of a spring 162. The arm 163 of this lever is connected by a spring 164 (Fig. 17) to an arm 165 fast to shaft 160. Thus the shaft 160 is yieldingly rocked clockwise. Carried by shaft 160 is a cam 160' for engaging the lug 74' on upper blade 74 of contacts 73. When the shaft 160 is rotated clockwise, cam 160' first closes the contacts 73 to complete the circuits through the primaries of the induction coils as explained in connection with Fig. 6. The sensing cycle then occurs resulting in energization of magnets 50 in accordance with the reading of the scale. Pawls 142 are set by the magnets 50 and then shaft 160 operates arms 159 to actuate the detent plates 152 for locking the pawls. Cam 160' now rides off the contact lug 74' permitting contacts 73 to open and cause deenergization of magnets 50. While this is occurring the outer end of arm 165 formed as a blocking lug 166 rides off the right hand side of a number 167 (as viewed in Fig. 17). An integral projection 168 of the arm 165 is then caught under a projection 169 of a pivoted latch 170 normally urged towards arm 165 by spring 171. The member 167 is fast to the operating shaft 140. The latter may now be moved counterclockwise by a crank handle 172.

Fixed to shaft 140 are bell levers 173 (Figs. 15 and 18) one to each recorder bank. Connected by springs 174 to the levers 173 are levers 175 rotatably carried by shaft 140. These levers 175 are pinned to the previously mentioned rack members 146. Thus members 146 are yieldingly drawn along with shaft 140 upon operation thereof counterclockwise. The members 146 will move until lugs 145 thereon are engaged with and stopped by the actuated pawls 142. In this manner, the members 146 and the shafts 149 operated thereby are stopped according to the load on the scale sensed by the selector mechanisms.

After members 146 have been stopped, shaft 140 and levers 173 continue to move stretching springs 174. To compel movement of shaft 140 to the end of its stroke, a suitable full-stroke pawl 176 (Fig. 17) cooperates with ratchet teeth 177 on member 167.

Each shaft 149 has fast therewith an indicating wheel 178 which may be seen through the sight window of casing 179.

The reading of the scale is permanently recorded by perforating mechanism which punches a tabulating card according to the Hollerith system in which each card column has ten positions 0 to 9, a perforation in one of these positions representing the number corresponding to the position. The punching mechanism comprises columns of ten punches 180, one column for each recorder bank. The upper portions of the punches slide in a fixed frame 181. A lower frame 182 is slidably movable on guide posts 183. The frame 182 is divided into two sections 184 and 185 separated by a narrow groove for receiving a record card 186.

The upper section 184 serves to guide the lower portion of the punches while the lower section 185 serves as the usual perforated die plate. Slidably guided for movement between fixed plate 181 and the frame piece 187 above it are interposer bars 188, one for each column of punches. The bars 188 are provided with racks 189 in mesh with pinions 190 which actuate the bars to position the lugs 191 thereof above one of the punches in each column.

Each pinion 190 is fast to one of the series of nested shafts 149. Thus when the rack members 146 are differentially positioned under control of the pawls 142, the shafts 149 simultaneously operate both the register wheels 178 and the pinions 190. The latter move the interposers 188 so that the lugs 191 thereon cover the punches 180 corresponding to the active pawls 142 and to the reading of the register wheels 178.

After the interposers have been differentially positioned, the card 186 is punched by the frame 182 moving upwardly carrying the card with it. Those punches not restrained against upward movement by the interposer lugs 191 will move with the card surface while those punches restrained by lugs 191 will penetrate the upwardly moving card. To move frame 182, a link 194 is connected to the lower die plate 185 and to a bell lever 195 having its upper end received in the cam slot 196 of a member 197 fast to the operating shaft 140. The cam slot 196 is shaped to oscillate the bell lever 195 after the shaft 140 has moved an amount equal to the full forward stroke of the members 146.

After the punching operation, the operator reverses the movement of crank handle 172 and shaft 140 operated thereby. During this movement the blocking end 166 of the arm 165 rides off the concentric portion 198 of member 167, (Fig. 17). The spring 162 now actuates bell lever 161 counterclockwise. The arm 163 of the lever has a stud 199 which engages with the lower edge of arm 165 causes the latter to also rock counterclockwise. Shaft 160 rocks correspondingly and through arms 159 returns detent plates 152 to lower position thereby unlocking pawls 142 which are returned to normal positions by suitable springs. During the same movement of shaft 160, the cam lug 160' rides over the lug 74' on upper contact blade 74. This causes clockwise movement of the cam lug about its pivot on the carrying disk 200. The cam lug is free to move clockwise relative to said disk; hence the contact blade 74 is not actuated downwardly by the cam lug upon its return to initial position with shaft 160.

The machine is now ready for another weighing and recording operation.

The relation between bars 28 and strip 32 is such that a spark from the strip will jump to the nearest bar. Thus, if the load on the scale is 135.6 lbs., the spark will jump to the bar 28 covering perforations 26 representing 136 pounds. The difference between the exact weight and the analysis of this weight is thus only 0.4 of a pound. If, accidentally, the spark jumps to the bar 28 covering perforations corresponding to 135 pounds, the error will be only 0.6 of a pound.

In any case, the error will be less than a pound. This is due to the fact that once a spark jumps to a bar 28, the bars being insulated from each other, the charge on this bar cannot escape to any other bar and through any perforations 26 except those covered by the particular bar to which a spark has jumped from conductive strip 32.

In Fig. 21 is a modification of the load analyzing means which while simpler is not as accurate since the chances for error are greater.

In this modification the pointer 14 is provided as in the other forms with a bracket 30, an insulating plate 31 attached thereto and a conductive strip 32. Departing from the other modification the conductive strip 32 has rigidly attached thereto a radially extending strip 210 of light conductive material. This radially extending strip is directly adjacent the perforated mica disk 25 and of substantially the same width as one of the radial conductive bars 28 of the other modifications, all of which bars it replaces.

In the operation of the scale the pointer 14 and the radial strip 210 will move together. The strip 210 will thereby be located in front of a set of perforations 26 in the mica disk 25 which corresponds to the reading on the dial 15 by the pointer 14. As in the previous modifications the secondary of the induction coils is connected to the conductive ring 29. Whenever the circuit to the secondary is interrupted a spark will jump from the conductive ring 29 to the conductive strip 32.

The charge in strip 32 is conducted to radial strip 210 from which sparks jump through perforations 26 behind the latter strip to the bands 24 exposed by the perforations. The remaining mechanism is the same as has been described in connection with the preferred form of analyzing device.

It will be evident in the second modification just described, that when the strip 210 is positioned equidistant between two sets of perforations such as for example correspond to 199 and 200, a spark may jump from the strip to either the 100 or the 200 pound band 24, another spark may jump from the strip to the 90 pound band, and a spark may jump to the 9 pound band. Thus, it is possible that instead of the analyzer reading 199 or 200, the analyzer may read 299. This error is not possible in the first modification using radial bars, as the latter confine the analysis to a definite load. Thus if a spark jumps to the bar 28 covering the "199 pound" perforations, there is no possibility that a spark may jump from this bar to the bar adjacent which covers the "200 pound" perforations because the bars 28 are thoroughly insulated from each other.

It will be understood while the invention has been disclosed in connection with the several modifications referred to, that modifications, variations, and changes may be made within the scope of the invention and without departing therefrom. It is therefore desired to be limited only by the scope of the following claims.

We claim:

1. In a scale including weighing mechanism for weighing multi-denominational order loads; means for translating the loads into denominational order equivalents, and electrical means operative across an open gap between the translating means and the weighing mechanism for rendering the latter means effective to translate the effective load into differential denominational order equivalents.

2. In a scale such as defined in claim 1 and means for rendering said electrical means ineffective until the weighing mechanism has substantially reached equilibrium under a load.

3. In a scale, a counter movable proportionally to the load, means for controlling operation of said counter, a load responsive member spaced from said means, and a high tension circuit for bridging the gap between the load responsive member and said means for rendering the latter effective to cause operation of the counter proportional to the load.

4. In a scale, recording means, means for controlling the setting of said recording means, a load responsive member spaced from said controlling means, a circuit for jumping a spark between the load responsive member and the controlling means for rendering the latter effective to control the setting of the recording means according to the load, and means for operating the recording means in accordance with its setting to make a record corresponding to the load.

5. In a scale, recording means, means for controlling operation of said recording means, a load responsive member spaced from said controlling means, and a circuit for jumping a spark between the load responsive member and the controlling means to render the latter effective for controlling operation of the recording means according to the load.

6. In a scale, differentially movable means, controlling means for determining movement of the differentially movable means, a load responsive member, a circuit for jumping a spark between the load responsive member and the controlling means for rendering the latter effective to control the differentially movable means, and means for delaying operation of said circuit until the load responsive member has substantially come to rest.

7. In a scale including weighing mechanism, an auxiliary device, means controlled by the weighing mechanism for controlling operation of said device, a circuit for jumping a spark between the weighing mechanism and the controlling means for rendering the latter effective to control the auxiliary device, and equilibrium sensing means for delaying operation of said circuit until the weighing mechanism is substantially at rest under a load.

8. In a scale including weighing mechanism; differentially operable auxiliary means, means controlled by the weighing mechanism for controlling operation of the auxiliary means, a circuit for jumping a spark between the weighing mechanism and the controlling means for rendering the latter effective to control the auxiliary means, and equilibrium sensing means for delaying operation of the circuit until the weighing mechanism is in equilibrium under a load.

9. In combination an auxiliary device, a load responsive member, a plurality of elements one at each unit load point along the path of said member whereby the latter during its movement passes some of the elements to select one of the elements in accordance with the magnitude of the load, and a circuit for jumping a spark between the load responsive member and the selected element for rendering the latter effective to control the auxiliary device.

10. In combination, an auxiliary device operable differentially one to nine predetermined steps, a load responsive element, means for translating operation of said load responsive element into differential equivalents for controlling the differentially movable device, and a circuit for jumping a spark between the load responsive element and the translating means for impressing upon the latter the differential equivalent of the operation of said element.

11. In combination, indicating means, a load responsive member, means for translating operation of said member into the equivalent of the load, an electric circuit for jumping a spark between the load responsive member and the translating means to impress upon the latter the equivalent of the load, and means controlled by the translating means for causing the indicating means to indicate the magnitude of the load.

12. In a combination including weighing mechanism, means for translating operation of the weighing mechanism into differential equivalents, a circuit for jumping a spark between the weighing mechanism and the translating means to impress upon the latter the differential equivalent corresponding to the load, and means for preventing the operation of said circuit until the weighing mechanism is substantially at rest under a load.

13. In a combination including means for weighing a multi-denominational order load, means for translating operation of the weighing means into denominational order differential equivalents, and electrical means for jumping a spark between the weighing means and the translating means to impress upon the latter the equivalent of the multi-denomination load.

14. In a combination including means for weighing a multi-denominational order load, means for translating the load into denominational order differential equivalents, and means for causing the weighing means to impress the equivalents of the different denominational orders of the load upon the translating means one denomination after another.

15. In a combination including means for weighing a multi-denominational order load, denominational order elements for translating the load into denominational order equivalents, and means for causing sparks to jump between the weighing means and translating elements, one denomination after another.

16. In a combination including a weighing device for a multi-denominational load, means spaced from the weighing device for translating the load into multi-denominational order equivalents, auxiliary mechanism, and electric circuits including in series the weighing means and the translating means for controlling the operation of said auxiliary mechanism according to the load, said circuits transmitting the current from the weighing device to the translating means across the gap between the device and the translating means.

17. In a combination including weighing mechanism, means, spaced from the mechanism for translating the operation of said mechanism into differential equivalents, means for impressing a charge on the weighing mechanism, said charge operating across the gap between the mechanism and the translating means for determining the operation of the latter, and means for timing the operation of said charge impressing means to occur when the weighing mechanism is at rest under a load.

18. In a combination including weighing means movable variably according to the load, auxiliary mechanism, a series of devices arranged along the path of movement of said weighing means, successive distances from a datum point, a jump spark circuit formed between the weighing means and one of said devices for causing the latter one device to control operation of said auxiliary mechanism according to the distance said latter one device is located from the datum point, and means for preventing operation of said devices until the weighing mechanism is substantially at rest under a load.

19. In combination, a counter, a load responsive element movable in an arcuate path, a series of devices unit load distances apart along said path, and jump spark circuits between the element and that one of said devices corresponding to the effective load on the scale for causing the latter to control the counter proportionally to the load.

20. In a combination including force measuring mechanism; auxiliary mechanism, a plurality of members insulated from each other and selected in accordance with operation of the force measuring mechanism, means for impressing a high tension electrical charge on the selected member, elements for controlling the auxiliary mechanism, and means between the members and the elements for placing the charge on a selected member in series with one of the elements in accordance with the force measured by the force measuring mechanism whereby the said one of the elements is effective to control the auxiliary mechanism.

21. In a combination including load weighing means; auxiliary mechanism, magnets for controlling said mechanism, a plurality of conductive members insulated from each other and held in fixed relation to each other and selected in accordance with operation of said weighing means, a plurality of conductive elements insulated from each other and crossing a plurality of said members, means between the members and the elements for selectively associating the members with the elements in accordance with different load magnitudes, means for impressing an electrical charge on the selected member and its associated element, and means associated with the elements for selectively controlling energization of the magnets.

22. In combination, a member movable in an arcuate path a plurality of elements arranged along the path of movement of said member, a plurality of conductors, each associated with one or more of said elements, an insulator frame for holding the elements and the conductors in spaced relationship to each other, weighing mechanism for selecting one of said elements, and means for placing in series in an electrical circuit the aforesaid member, the selected element, and the conductors associated with said element.

23. In combination, a load responsive element, a series of conductors, an insulating cover for said conductors with openings to expose one or more of said conductors in accordance with multi-denominational order loads, and means for causing a charge to be transmitted from the load responsive element to the conductors through said openings.

24. In combination, a load responsive element, a plurality of conductors arranged along the path of said element to be selected one at a time by the element, a plurality of conductive members crossing the conductors, means for associating one or more of said conductive members with each conductor in accordance with multi-denominational order loads, means for placing an electric charge on the conductor selected by the load responsive element and the conductive members associated therewith, and means for preventing the charge on the selected conductor escaping therefrom to any other conductor or conductive element.

25. In combination, a load responsive element movable in an arcuate path, a series of radially extending conductors arranged along said path, a plurality of conductive members arranged concentrically to cross the conductors, means for associating one of the conductors with one or more of the conductive members, and means for electrically connecting the load responsive element with a radial conductor corresponding to the load and also with the conductive members associated with the last-mentioned conductor.

26. In combination, a pair of relatively movable devices, electrical means for jumping a spark between said devices when the latter are relatively at rest, and means controlled by the electrical means for operation in accordance with the relative position between the devices.

27. In combination, a pair of relatively movable devices located in constantly spaced planes, a plurality of differentially movable elements in denominational order relationship, actuating means for differentially actuating said elements, electrical circuits including a spark discharge between the relatively movable devices for controlling operation of said actuating means, and a device for timing the spark discharge to occur at only one variable point of the relative displacement of said first-named devices.

28. In combination, a pair of relatively displaceable devices, a plurality of differentially movable elements of different orders, electrical circuits including in series said devices for controlling operation of said elements in accordance with relative displacement of said devices, and a device for causing said circuits to take effect serially to control said elements one after another.

29. In combination, differentially movable means, controlling means for determining movement of the differentially movable means, a variably displaceable member, a circuit for jumping a spark between the displaceable member and the controlling means for rendering the latter effective to control the differentially movable means, and means for delaying operation of said circuit until the displaceable member has substantially come to rest.

30. In a scale having mechanism displaceable in accordance with major and minor orders of load; means for translating displacement of said mechanism into electrical equivalents including banks of elements, each bank corresponding to an order of the load, one element of each bank being selected in accordance with displacement of said mechanism, means for causing the selection of said elements to be effected with a maximum variation from the true position of displacement of said mechanism less than the smallest unit of the minor order, and means for timing the selection to occur only when the mechanism is substantially at rest.

31. In a scale having mechanism displaceable in accordance with major and minor orders of load; means for translating displacement of said mechanism into electrical equivalents, means differentially operable under control of the translating means, means for preventing variation in the electrical translation of displacement of said mechanism by an amount differing from the true displacement of said mechanism by more than the smallest unit in the minor order of displacement, and means for delaying operation of said translating means until the mechanism is substantially at rest.

32. In a scale having a member displaceable in accordance with different denominations of a load; differentially operable devices, denominational order means for determining operation of said devices in accordance with the load, and a single element selected by said displaceable member for controlling the denominational order means in accordance with the displacement of said member.

33. In combination, a pair of relatively movable devices, electrical means for jumping a spark between said devices when the latter are relatively at rest, and movable means controlled for movement by the electrical means in accordance with the relative position between the devices.

34. In combination, a pair of relatively movable devices, electrical means for jumping a spark between said devices when the latter are relatively at rest, and differentially movable registering means controlled for movement by the electrical means in accordance with the relative position between said devices.

In testimony whereof we hereto affix our signatures.

EDWARD J. VON PEIN.
FRANK SHOWALTER.